United States Patent [19]
Slater

[11] Patent Number: 5,956,138
[45] Date of Patent: Sep. 21, 1999

[54] MULTIPLE-ZONE EMISSION SPECTRA COLLECTION

[75] Inventor: Joseph B. Slater, Dexter, Mich.

[73] Assignee: Kaiser Optical Systems, Ann Arbor, Mich.

[21] Appl. No.: 09/032,075

[22] Filed: Feb. 27, 1998

[51] Int. Cl.⁶ ....................................................... G01J 3/30
[52] U.S. Cl. ..................... 356/318; 356/244; 356/346; 356/417; 356/311
[58] Field of Search ................................... 356/318, 244, 356/346, 417, 311

[56] References Cited

U.S. PATENT DOCUMENTS

| 5,469,255 | 11/1995 | Kamada et al. | 356/318 |
| 5,777,729 | 7/1998 | Aiyor et al. | 356/318 |

OTHER PUBLICATIONS

J. White, N. Alpert, A. DeBell; "Photoelectric Raman Spectrometer," *Journal of the Optical Society of America,* vol. 45, No. 3, Mar. 1955, pp. 154–166.

*Primary Examiner*—Robert H. Kim
*Assistant Examiner*—Reginald A. Ratliff
*Attorney, Agent, or Firm*—Gifford, Krass, Groh, Sprinkle, Anderson & Citkowski, PC

[57] ABSTRACT

The collection of spectral information is enhanced through the formation of multiple zones of excitation and emission. In one embodiment, a plurality of the zones are located within a sample substance, thereby increasing the efficiency of sample spectrum collection. In another embodiment, a reference substance is positioned so as to enclose at least one of the excitation/collection zones. The reference substance adds a known spectrum to the collection path, enabling analytical instrumentation to compare the sample and reference spectra for calibration purposes. In a further embodiment, one of the zones may be positioned within a sealed volume, and compositional changes in the sealed volume may be detected and used for leak-detection purposes.

18 Claims, 4 Drawing Sheets

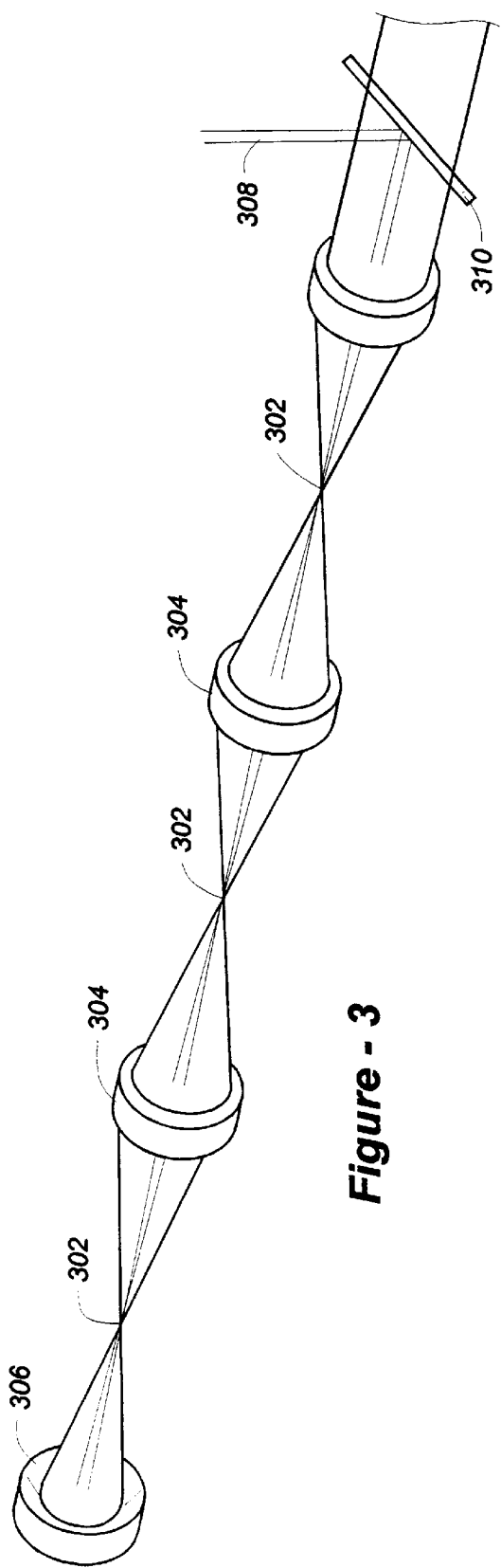
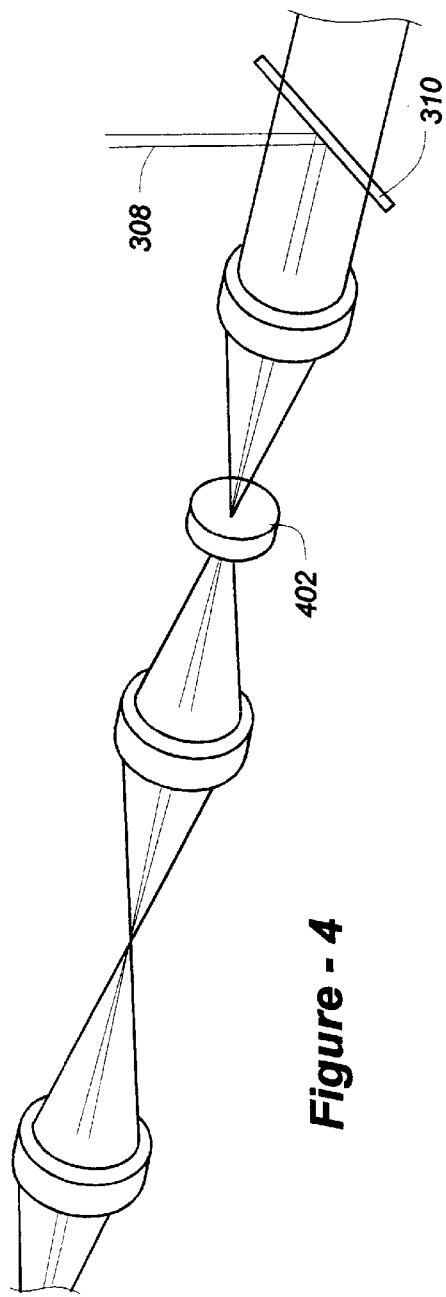
*Figure - 3*
*Figure - 4*

MULTIPLE-ZONE EMISSION SPECTRA COLLECTION

FIELD OF THE INVENTION

The present invention relates generally to spectral analysis and, in particular, to the use of multiple zones wherein excitation and collection occur simultaneously, thereby facilitating enhanced sample collection efficiency and other functions such as self-calibration and leak detection.

BACKGROUND OF THE INVENTION

When attempting to collect an emission spectrum of a transparent fluid, particularly a gas, collection efficiency is critical due to the low degree of scattering by the sample. Such is the case in Raman and fluorescence detection and other forms of spectral analysis.

Existing collection geometries used in conjunction with transparent samples include in-line (forward scatter and backscatter), and 90-degree configurations. In a 90-degree configuration, illustrated in FIG. 1, an excitation beam 102 is roughly perpendicular to a collection path 104 within a zone 106 wherein sample scattering takes place. A first lens 108 is typically used to focus the excitation beam, and a second lens 110 is typically used to focus the collection beam onto a spectropraph entrance slit 112 or some other suitable detection means. Other elements such as filters and beam-directing elements have been eliminated from the drawing for the sake of clarity.

The 90-degree geometry offers the potential for high collection efficiency if the sample can be presented directly to the slit 112; for example, the excitation light is arranged to be parallel and coincident with the slit or imaged onto the slit. The configuration exhibits a serious drawback, however, in that the collection and excitation paths are physically separate, and thus use different optics. This leads to extreme sensitivity to alignment errors and inherent instability, which restricts the usefulness of this arrangement. The same holds true for forward-scatter configurations, wherein the excitation and collection are essentially co-axial, but oriented outwardly from a sample in opposite directions.

The use of backscatter, in contrast, is inherently stable because the excitation and collection paths may be combined so as to share the same optical path and associated optical elements. Referring to FIG. 2, some form of beam combiner 204 is typically used to merge or "fold" the excitation beam 206 into a combined excitation/collection path 210. The sample lens 212 in this case focuses the excitation energy into and collects spectrum from a small region 214. Optical filters (not shown) including the beam combiner 204 function to remove excitation wavelengths from the collection path, and a lens 216 or other elements including fiber optics may be used to relay the collected spectrum to a spectrograph input 220.

Thus, whereas the 90-degree geometry potentially collects data from the entire extended region along the slit, with backscatter data are collected only from the small region at the focus 214 of the sampling lens 210. As such, the collection efficiency of the backscatter arrangement is inferior as compared to the 90-degree geometry, leaving an outstanding need for a spectral analysis configuration having an improved collection efficiency without the need for critical optical alignment of separate excitation and collection paths.

SUMMARY OF THE INVENTION

The present invention enhances the collection of emission spectra through the simultaneous formation of multiple conjugate foci within the same or different materials, resulting in a plurality of zones of excitation and collection. The emissions occurring at each focus, referred to herein as "zones," are integrated into the same optical collection path, which may then be relayed or imaged to the same utilization device or onto the end of an optical fiber for remote detection. Delivering the combined collection spectra to the same instrumentation increases the amount of information available, for example, for analytical purposes.

Broadly, according to the invention, a source of excitation radiation is directed along an excitation path, which is folded into a counter-propagating collection path to create a basic backscatter geometry. In contrast to existing configurations, however, lenses or other suitable optical elements are used to form multiple conjugate foci along the combined path, resulting in a plurality of localized zones of excitation and collection. The excitation is preferably sufficiently concentrated within each zone to enhance the stimulation of an emission spectrum, thus causing the spectra associated with each zone to enter into the same collection path.

In one embodiment of the invention, two or more of the zones are located within the same sample substance, thereby increasing the efficiency of collection of the emission spectrum characteristic of the sample itself. In a dirrerent embodiment of the invention, a reference substance encloses at least one of the combined excitation/collection zones. The reference substance emits a known spectrum when stimulated by the excitation radiation, enabling the collection path to simultaneously carry both the sample spectrum and reference spectra, enabling the reference spectrum to be used for calibration purposes.

In a different embodiment of the invention, a sealed volume is used to enclose at least one of the zones so as to provide a leak-detection capability. Specifically, the sealed volume is preferably disposed in a physical path associated with the optical entry into a vessel containing a sample substance, and the contents of the volume, if any, may be monitored to determine if any of the sample has entered into the sealed volume.

BRIEF DESCRIPTION OF THE DRAWINGS

FIG. 3 is a schematic, oblique drawing of an embodiment of the invention wherein optical elements are used to simultaneously produce multiple excitation/collection zones for enhanced emission spectra detection efficiency;

FIG. 4 is a schematic, oblique drawing of an embodiment of the invention wherein a reference material substantially encloses at least one of the excitation/collection zones to realize a calibration function;

DETAILED DESCRIPTION OF THE INVENTION

Figure 1:
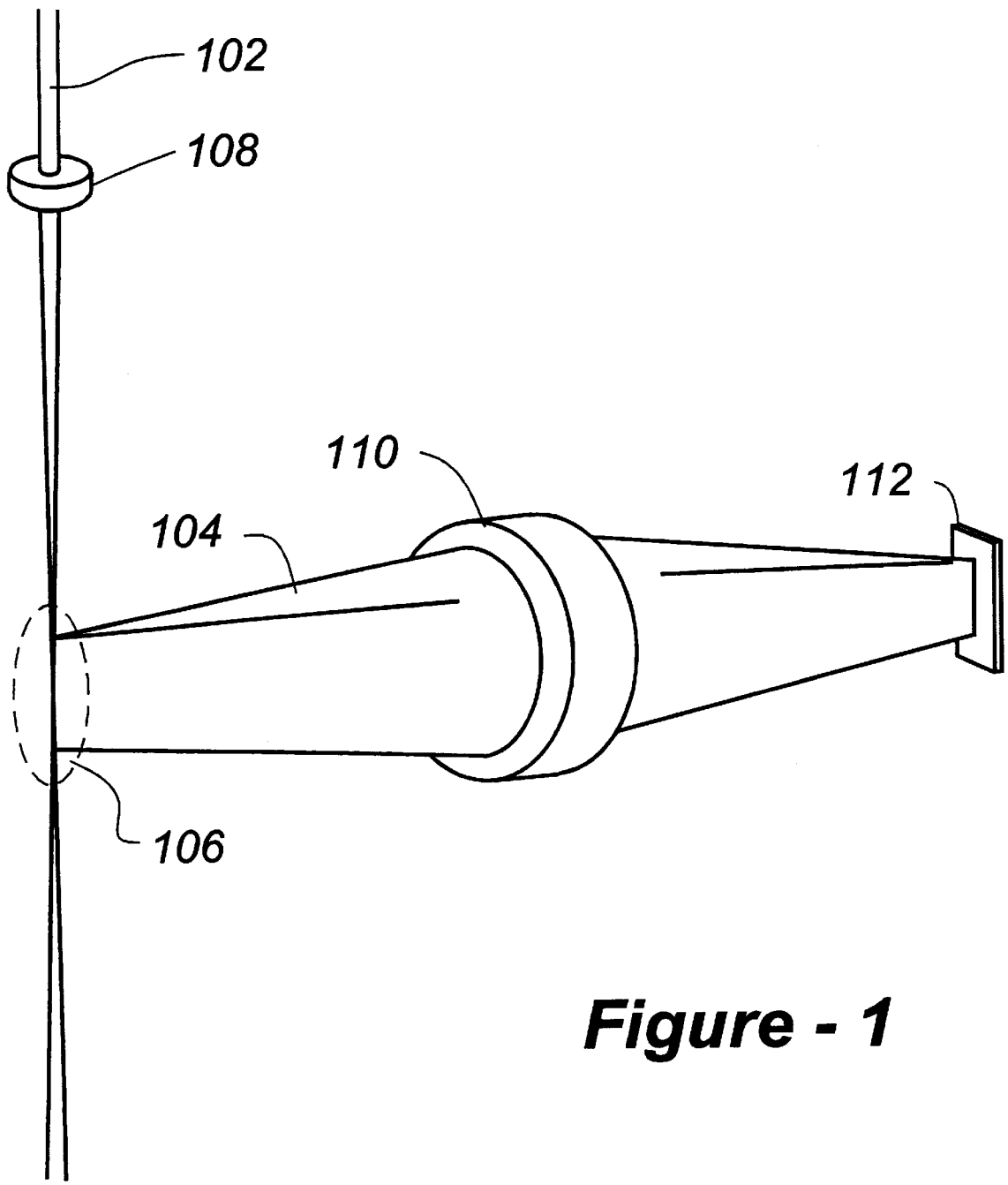
FIG. 1 is a schematic illustration of a prior-art emission collection arrangement, wherein the excitation and collection paths are oriented at substantially 90 degrees with respect to one another.
Figure 2:
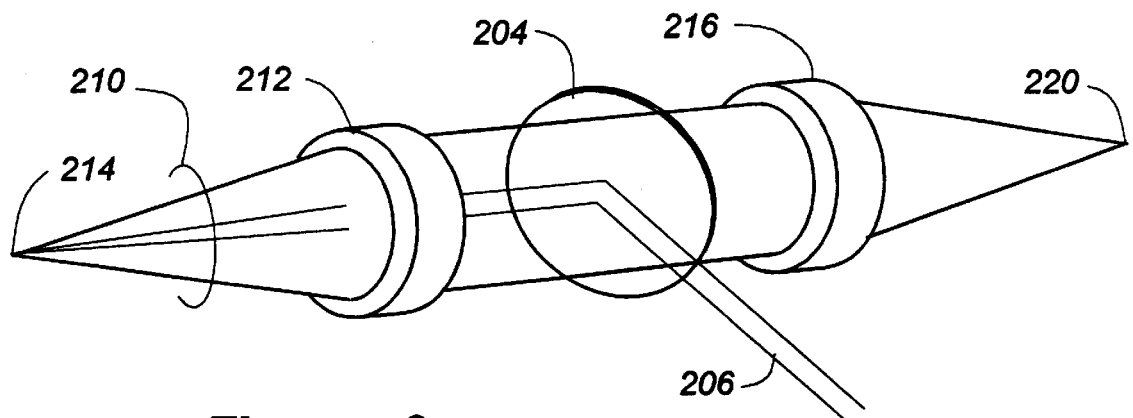
FIG. 2 is a schematic, oblique drawing of a prior-art emission-collection arrangement wherein an excitation beam is folded into a collection path and focused to a single sample point.

As discussed in the Background above, the present invention enhances the collection of emission spectrum through the formation of multiple zones of excitation and collection. The emissions occurring at each zone are integrated into the same collection path, thereby increasing the amount of information available for analytical and other purposes.

FIG. 3 illustrates a basic embodiment of the invention, wherein three conjugate foci 302 are established through suitable optics such as relay lenses 304, resulting in three zones, one at each focus, of simultaneous excitation and collection. An additional optical element such as spherical mirror 306 may be used redirect the excitation and collection paths back through the relay, further enhancing efficiency.

Excitation energy 308 is folded into the collection path to create the combined excitation/collection path. This integration of beams may be carried out using a variety of techniques, including the use of a beam combiner 310, preferably of holographic derivation, as described in commonly assigned U.S. Pat. No. 5,377,004. Alternatively, element 310 may utilize a spot mirror supported in the collection path to redirect the excitation energy, or an apertured mirror may be used to pass the excitation energy while redirecting the collected spectrum. These latter techniques are described in co-pending U.S. patent application Ser. No. 08/918,459, the subject matter of which is incorporated herein by reference.

The emission spectrum from each of the zones 302 passes beam rightwardly through beam combiner 310 in FIG. 3. Various optical elements of conventional design, not shown in the drawing, may be added to filter, focus, redirect or relay the collected spectrum, as appropriate. In addition, one or more optical fibers may be employed for remote operation.

In FIG. 4 a reference substance 402 encloses, or occupies, one of the foci or zones. In this case the emission collected from the reference substance may be used for calibration purposes, for example, to quantify a particular gas in a multi-component gas mixture. As with the sample, the reference substance may be a solid, liquid or gas. Materials of differing phase may be positioned at each zone as long as appropriate containment is provided. In the case of a liquid, the optical components may need to be immersed in the liquid, though the principal of simultaneous zone formation remains essentially the same. With solids, the reference material may enclose one of the zones, with another focal point being coincident with the surface of a solid sample.

The reference substance 402 may be contained in such a way as to equalize the sample and reference in terms of temperature and/or pressure, thereby providing a calibration signal which compensates for sample environmental factors. For example, a flexible, thermally conductive container containing a reference gas may be immersed within a gaseous sample, thereby maintaining the reference in thermal and pressure equilibrium with the sample. As such, any changes in the sample environment will cause a change in the signal level of the reference gas which then can be used, within the same collection spectrum, to remove the effects of temperature and pressure from the measurement.

As further options, a reference substance contained within a thermally conductive but rigid container, or a solid (such as a diamond film), may be used to collect a reference signal which is equalized in terms of sample temperature, but not pressure. Or a flexible container which is separately temperature-controlled may be used to develop a reference signal which is insensitive to sample temperature, but not pressure.

As yet further alternatives, a rigid, thermally non-conductive container may be used to generate a reference signal which is substantially insensitive to both temperature and pressure, or a supercritical fluid may be used as a reference substance which is potentially extremely sensitive to both pressure and temperature.

Figure 5:
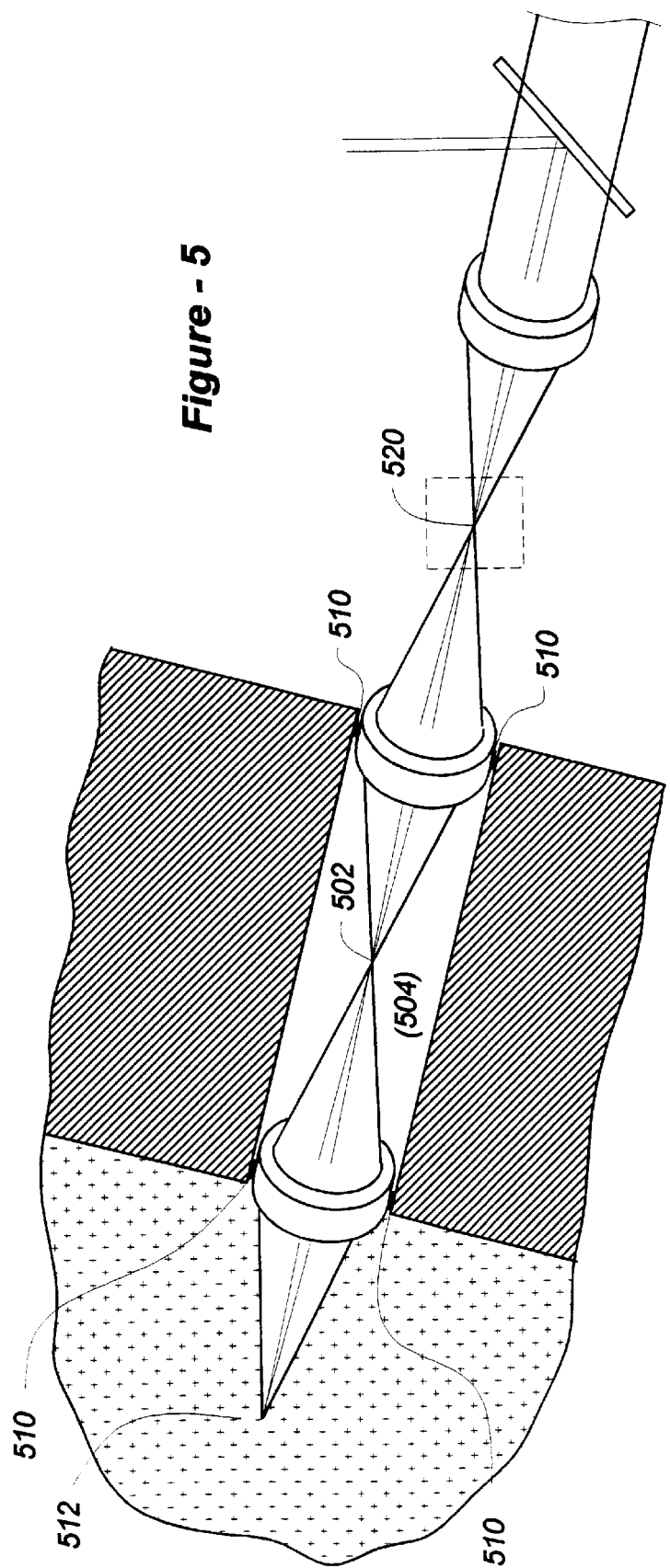
FIG. 5 is a schematic, oblique drawing of an embodiment of the invention wherein a sealed volume encloses one or more combined excitation/collection zones to realize a leak-detection capability.

As shown in FIG. 5, one or more excitation/collection zones 502 may be situated within a sealed volume 504 associated with the penetration into a vessel containing a sample which is particularly hazardous, or valuable, or both. The relay optics may include seals 510, or separate window elements may be provided with seals to ensure that the volume 504 is physically separated from the sample unless a leak occurs.

The volume 504 may be empty, filled with a known substance, or evacuated. At point 502, the contents of the volume 504, if any, will be optically stimulated, resulting in the integration of any emission spectrum into the collection path. Such spectrum may then be monitored and used for leak-detection purposes.

For example, with an empty or evacuated volume 504, should the sample leak thereinto, a rise in sample collection efficiency may be indicative of a leak. Alternatively, with the chamber 504 containing a known substance, the ratio of sample to known substance may be monitored. In the event that the proportion of the known substance deteriorates, this may signal a leak as well. As yet a further alternative, the inner wall of the volume 504 may be coated with a material which, if the sample is a liquid, enters into solution so as to create an emission spectrum where there was none before, and the presence of this spectrum may then be detected. Use of a fluorescent material in solution may be particularly effective in this case. Or the material in solution may cause the liquid to become at least partially opaque, thereby retarding spectral collection overall.

For applications in which the sample material is particularly hazardous, it is important to know if either of the seals 510 fail, so that repairs can be effected before both seals fail. Therefore, with the chamber 504 containing a known substance, a leak from the other seal, allowing air into the chamber, could be detected by a decrease in emissions from the known substance and/or an increase in emissions characteristic of oxygen and/or nitrogen.

It should be evident that any or all of the various embodiments of the invention (to enhance sample collection efficiency, for calibration, and for leak detection) may be used to generate emission spectrum for integration into a common excitation/collection path. As shown in FIG. 5, if the volume 504 contains a known substance, it may also be used for sample calibration, at least up until the point at which a leak is detected. Alternatively, a reference substance may be placed over a separate zone such as 520, as shown by the broken line, such that point 512 collects sample emission, point 502 collects an emission associated with leak detection, and point 520 collects an emission associated with calibration, all of which are delivered along a combined collection path to appropriate instrumentation for analysis. In addition, points 502 and/or 520 may be maintained in thermal equilibrium with the sample substance by circulating a contained, thermally conductive fluid around one or both of the points 502 and 520. Such an arrangement might be useful or necessary to control condensation of the substance used for calibration and/or leak detection.

Figure 6:
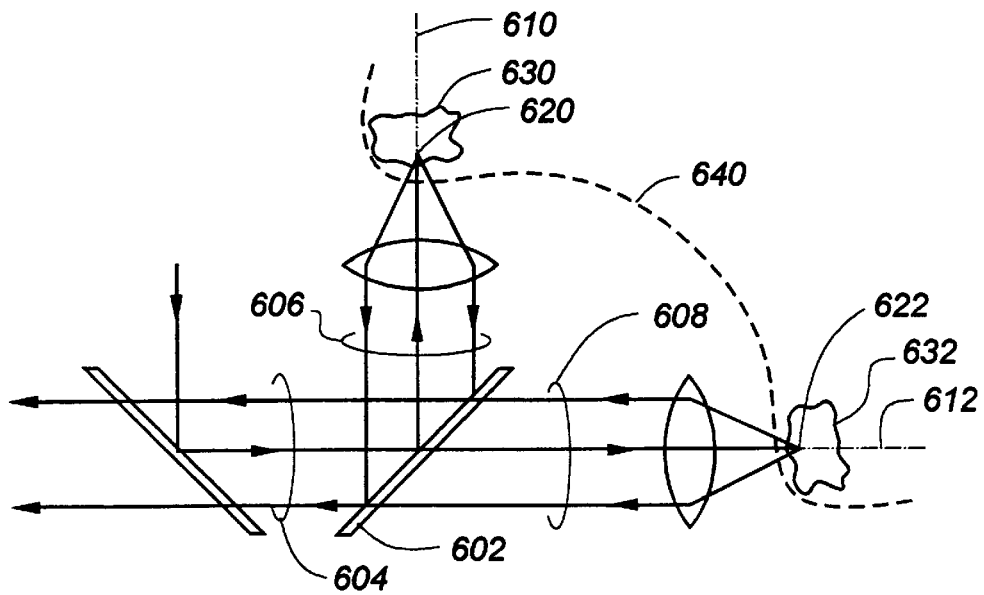
FIG. 6 is a drawing of an alternative embodiment of the invention wherein an optical element is used to separate a combined excitation/collection path into a plurality of such paths to create multiple zones along independent axes.

FIG. 6 is a drawing which illustrates an alternative embodiment of the invention wherein an optical element such as beamsplitter 602 is used to divide a combined excitation/collection path 604 into a plurality of independent combined paths such as 606 and 608 so as to create multiple zones of excitation and collection along independent axes 610 and 612. Although only two such axes 610 and 612 are shown substantially transverse to one another in the drawing, it will be understood to those with skill in optics that additional axes, at different angles, may be created through appropriate beam-splitting elements. In addition, although only point of excitation is shown with respect to each axis (points 620 and 622, respectively), additional zones may be established along each axis in a manner consistent with that depicted in FIGS. 3–5, herein, including the use of a counter-propagating reflective optics such as spherical mirror 306 and/or zones or materials for calibration or leak-detecting purposes.

Although each point 620 and 622 is depicted in conjunction with discrete sample 630 and 632, respectively, broken line 640 is used to show that the sample areas may, in fact, form part of the same sample under investigation in the event that, for example, one wishes to sample physically spaced-apart points of the same material. As a further option, in the event that the emissions along the multiple axes are known to be different from one another in terms of magnitude, the beam-separating function provided by element 602 may be non-symmetrical to take this into account. That is, if the collected spectrum along axis 610 is known to be lower in magnitude than that along 612, element 602 may be chosen to impart a greater percentage of excitation upwardly in the drawing of FIG. 6, thereby providing less in a direction rightwardly as shown in the figure.

That claimed is:

1. Spectral emission collection apparatus, comprising:

a source of excitation radiation;

means for integrating the excitation radiation into a combined excitation/collection path; and a plurality of optical elements for focusing the combined excitation/collection path into a plurality of localized zones, such that a substance occupying one of the zones is stimulated by the excitation radiation contained within the combined path, thereby causing a spectrum emitted by the substance to enter into the combined path.

2. The apparatus of claim 1, wherein the same sample substance encloses two or more of the localized zones.

3. The apparatus of claim 1, wherein a reference substance encloses one of the zones, causing the integration of a known spectrum into the combined path.

4. The apparatus of claim 1, further including:

a sealed volume enclosing one of the zones, causing a spectrum emitted within the volume, if any, to enter into the combined path for leak-detection purposes.

5. The apparatus of claim 1, wherein the spectrum emitted by the substance is a Raman spectrum.

6. The apparatus of claim 1, wherein the spectrum emitted by the substance is a fluorescence spectrum.

7. The apparatus of claim 1, further including an additional optical element to separate the combined excitation/collection into a plurality of subsidiary combined paths, each subsidiary path including one or more optical elements for focusing the respective subsidiary path into one or more localized zones, such that a substance occupying one of the zones is stimulated by the excitation radiation contained within the combined excitation/collection path, causing spectrum emitted by the substance to enter into the combined excitation/collection path.

8. Apparatus for calibrating the optical spectrum of a sample substance using the spectrum of a reference substance, comprising:

a source of excitation radiation;

means for merging the excitation radiation into a combined excitation/collection path; and a plurality of optical elements for focussing the combined excitation/collection path into a plurality of localized zones, with the sample substance occupying one of the zones and the reference substance occupying another of the zones, causing the spectra emitted by both the sample substance and the reference substance to enter into the combined path.

9. The apparatus of claim 8, wherein the reference substance is disposed within a sealed container immersed within the sample substance.

10. The apparatus of claim 9, wherein the container is thermally conductive, enabling the sample substance and reference substance to reach thermal equilibrium.

11. The apparatus of claim 9, wherein the container is sufficiently flexible to permit the sample substance and reference substance to reach a pressure equilibrium.

12. The apparatus of claim 8, wherein the spectra emitted by the sample and reference substance are Raman spectra.

13. The apparatus of claim 8, wherein the spectra emitted by the sample and reference substance are fluorescence spectra.

14. The apparatus of claim 8, wherein the sealed container is disposed adjacent the sample substance, the apparatus further including means for determining whether the sample substance has entered into the container.

15. A method of collecting optical emission spectrum, comprising the steps of:

providing a source of excitation radiation;

integrating the excitation radiation into a combined excitation/collection path;

focussing the combined path into a plurality of localized zones;

placing one or more substances to be characterized. at two or more of the zones, such that the substance at each zone is stimulated by the excitation radiation within the combined path to emit characteristic optical spectra; and analyzing the characteristic optical spectra.

16. The method of claim 15, wherein the same sample substance encloses two or more of the zones.

17. The method of claim 15, wherein a sample substance encloses one of the zones, and a reference substance emitting a known spectrum encloses a different one of the zones.

18. The method of claim 15, further including the steps of:

placing a sealed volume around one of the zones; and monitoring the spectrum obtained from the zone within the volume to determine the contents of the volume, if any.

* * * * *